United States Patent [19]

Stracke

[11] 3,816,244

[45] June 11, 1974

[54] PROCESS FOR OPERATING A GAS-COOLED NUCLEAR REACTOR WITH A STANDPIPE PLUG HAVING COOLANT FLOW THERE THROUGH

[75] Inventor: Wilfried Stracke, Oberehrendingen, Switzerland

[73] Assignee: Brown Boveri & Company Limited, Baden, Switzerland

[22] Filed: Aug. 17, 1972

[21] Appl. No.: 281,499

[30] Foreign Application Priority Data
Oct. 15, 1971 Switzerland................ 15097/71

[52] U.S. Cl.............. 176/60, 176/30, 176/33, 176/87, 176/65
[51] Int. Cl.. G21c 15/14, G21c 15/22, G21c 19/20
[58] Field of Search............ 176/30, 31, 32, 60, 87, 176/33, 36 R, 65

[56] References Cited
UNITED STATES PATENTS
3,535,206  10/1970  Germer.................. 176/36 R
3,536,584  10/1970  Long et al................ 176/87

FOREIGN PATENTS OR APPLICATIONS
1,033,046  6/1966  Great Britain.............. 176/87
1,115,476  5/1968  Great Britain.............. 176/87
1,084,319  9/1967  Great Britain.............. 176/87

*Primary Examiner*—Carl D. Quarforth
*Assistant Examiner*—Roger S. Gaither
*Attorney, Agent, or Firm*—Pierce, Scheffler & Parker

[57] ABSTRACT

A method of operating gas-cooled nuclear reactor which is refuelled through the opened standpipe located in the reactor vessel, the standpipe and plug being provided with a cooling system and the plug accomodating the control-rod drive and incorporating a guide tube through which the control rod can be introduced into and withdrawn from the reactor core, in which method the plug is supported with cold gas corresponding to the cooling gas of the reactor, such that a primary flow ("a") of cold gas removes heat from the plug and a secondary flow ("b") of cold gas removes heat from the control rod guide system and both flows are passed to the reactor core, the pressures of the primary ("a") and secondary ("b") flows being at least as high as is the highest gas pressures in the reactor core.

3 Claims, 1 Drawing Figure

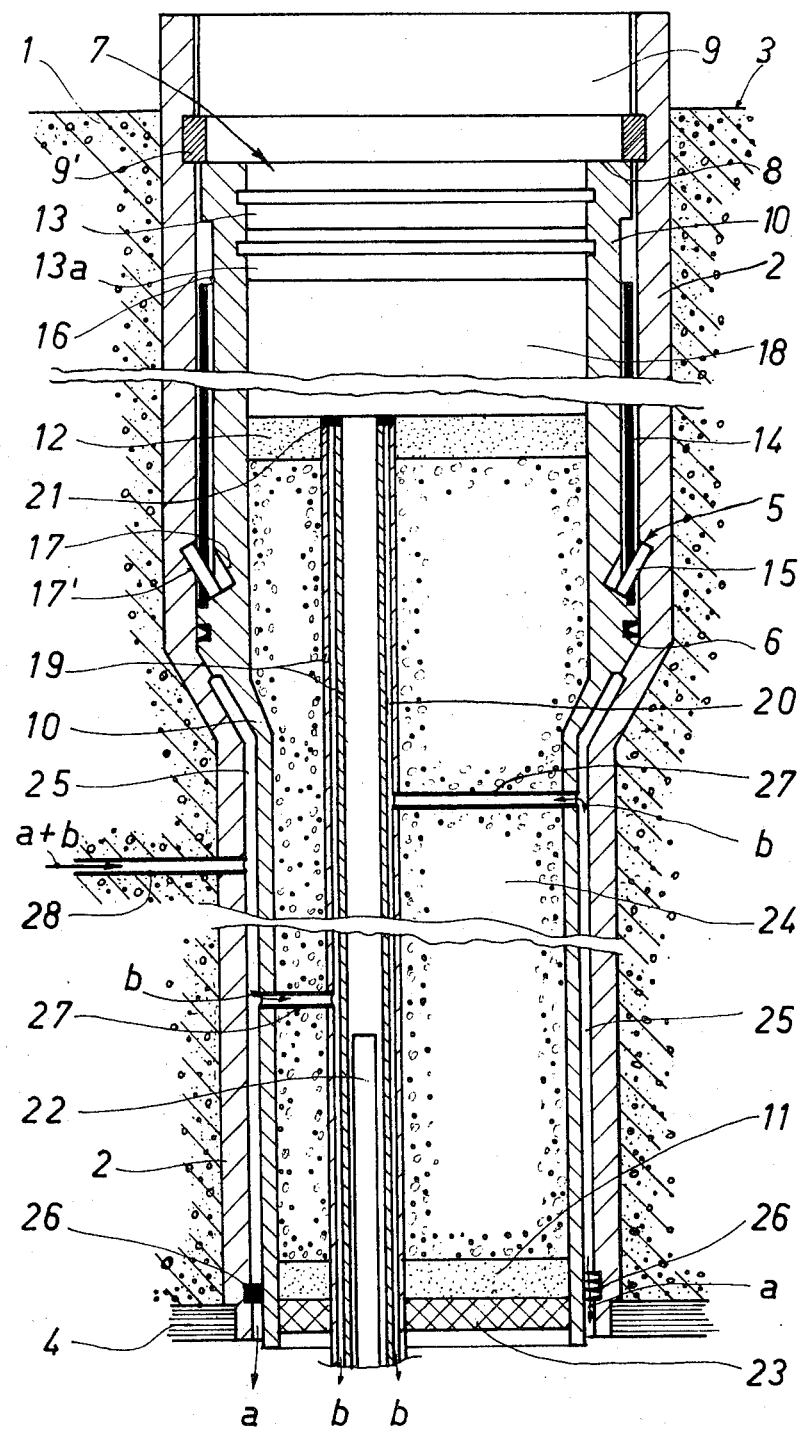

PROCESS FOR OPERATING A GAS-COOLED NUCLEAR REACTOR WITH A STANDPIPE PLUG HAVING COOLANT FLOW THERE THROUGH

This invention relates to the nuclear reactor art, and is concerned with an improved procedure for operating a gas-cooled nuclear reactor which is refuelled through an opened standpipe located in the reactor vessel, the standpipe and its plug being provided with a cooling system, the plug accommodating the control-rod drive and incorporating a guide tube through which the control rod can be introduced into and withdrawn from the reactor core. The invention further concerns the provision of apparatus for carrying out the improved procedure.

Nuclear reactors are known having standpipes which penetrate the reactor vessel and which are sealed with a plug which is removed during the refuelling process, the plug being cooled during operation. Water is used as the coolant for this purpose. In the case of gas-cooled reactors, — in particular, high-temperatures reactors, — efforts are made, for economic reasons, to achieve higher temperatures, on the one hand, and, on the other, to refuel the reactor while under normal operating load. Because of the graphite technology of the reactor core no water is allowed to the primary circuit. Accordingly, the plug cooling system has to be shut down during the refuelling process. This means, however, that the cooling system has to be emptied, or at least made safe against leakage. Furthermore, during the time between shutting down the cooling system and removing the plug the plug is not cooled by the charging machine, thus making it difficult to ensure faultless manipulation. Should a fault occur in the charging machine during withdrawal or shortly beforehand, the resultant overheating of the plug necessitates that the reactor has to be shut down.

A principal object of the present invention is to provide a procedure which eliminates the disadvantages mentioned and which increases the operating security of a gas-cooled nuclear reactor.

The inventive object just stated is realized by supplying the plug with cold gas corresponding to the cooling gas of the reactor, such that a primary flow removes heat from the plug and a secondary flow removes heat from the control rod guide system; both of these flows are then passed to the reactor core, the pressures of the primary and secondary flows being at least as high as is the highest gas pressure in the reactor core.

Apparatus for carrying out this procedure for operating a gas-cooled reactor is characterized in that the plug is located in the standpipe by means of a positive-acting fixing device with double seals and a locking device, and in that between the standpipe and the plug sleeve on the reactor side there is an annular space which is almost sealed with respect to the reactor core by a throttle, the annular space being connected to a pipe contained in the reactor vessel, and the annular space is connected by way of at least one hole to the control-rod guide tube which is provided with an annular gap and is open at the end adjacent the reactor core.

By the above described measures there is ensured an increased security. In addition, this solution offers the further advantage that the fuel assembly or assemblies can also be exchanged while the reactor is in power operation without the reactor having to be shut down in the event of suddenly occurring faults. Also, the simple construction of the invention simplifies manipulation, and no account has to be taken of the cooling medium. Moreover, the procedure of the invention ensures continuous cooling of the standpipe and the plug, thus eliminating even brief overheating of the components during the refuelling process.

The invention will now be explained in more detail and with reference to the appended drawing, which latter shows a longitudinal section through the standpipe of a gas-cooled nuclear reactor.

The wall of pressure vessel 1 of a gas-cooled nuclear reactor surrounds a standpipe 2, which standpipe projects through the reactor platform 3. On the side of the pressure vessel 1 facing the reactor core there is a liner 4 which protects the concrete container against radiation by heat and fission materials and also acts as a seal. Standpipe 2 includes a constriction in the transition zone of which the positive-acting fixing device 5 and also the double seals 6 are located. A locking device 9,9' engages the edge of plug 8 and seals off standpipe 2 with respect to the outside.

Plug 7 consists essentially of a sleeve 10, which has a constriction corresponding to that of standpipe 2, a plug bottom 11, intermediate bottom 12 and plug caps 13 and 13a which are in two parts to meet the necessary safety requirements. The positive-acting fixing device 5 for fixing plug 7 in standpipe 2 is contained in a recess 16 in sleeve 10 in the region between double seals 6 and locking device 9. Fixing device 5 comprises a spacer tube 14 provided with oblique holes in which cylinders 15 can slide. Sleeve 10 and standpipe 2 have slots 17 and 17' which accommodate the ends of cylinders 15, thus forming a means of locking or fixing plug 7 with respect to standpipe 2. When the spacer tube 15 is raised by mechanical or hydraulic means (not shown), the cylinders 15 slide out of, or further into, slots 17 and 17', thus releasing the fixing device so that the plug 7 can be withdrawn.

A guide tube 19, accommodating control rod 22, extends from intermediate bottom 12 to and through plug bottom 11: guide tube 19 is double-walled and defines an annular gap 20.

Plug bottom 11 surrounds guide tube 19 and is fixed to sleeve 10, the plug bottom 11 being provided with insulation 23 on the side facing the reactor gas space. The absorber space 24 between plug bottom 11 and intermediate bottom 12 is filled with loose radiation-absorbing material and also surrounds guide tube 19.

Between standpipe 2 and plug 7 there is an annular space 25 which is closed at one end by the constriction and seal 6, and at the other end by a throttle 26 located in the standpipe 2. This throttle may consist of a simple piston ring 26'.

Cold-gas supply pipe 28, which is contained in the body of pressure vessel 1, terminates in annular space 25. In this annular space 25, the sleeve 10 of plug 7 is provided with a hole or, when absorber space 24 is filled with loose material, a tube 27 which connects annular space 25 with annular gap 20 in guide tube 19.

The operation of the cooling system will now be explained in more detail. The positive-acting fixing device 5 holds plug 7 in standpipe 2 relative to the gas space of the reactor which is under positive pressure. The double seals 6 prevent cooling gas from escaping from the gas circuit of the reactor. A piston ring 26' is fitted in standpipe 2 so that hot gas from the reactor core cannot act on annular space 25. Since this ring is designed with a certain degree of permeability, a primary flow (arrow "*a*") of cold gas, which is fed into annular space 25 by way of supply tube 28, flows continuously across the piston ring 26', which acts as a throttle, and into the hot-gas space. Heat is thus removed from plug 7 and reintroduced into the hot-gas space. Standpipe 2 and liner 4 are surrounded by cooling coils (not shown) fitted in the wall of the concrete pressure vessel. In order to cool the guide tube 19 to some extent, and also indirectly the control rod 22, a secondary flow (arrow "*b*") is bled from annular space 25 by way of tube 27 which when heated, — as with the primary flow, — passes into the gas space of the reactor.

The relatively cold cooling gas flowing through the annular space 25 and annular gap 20 must be maintained at a pressure higher by a certain difference than that of the gas in the reactor core, but at least as high as the highest gas pressure occurring in the whole gas cycle, so that reversal of the flow direction is not possible. If plug 7 is released and raised, supply tube 27 need not be closed and cooling gas continues to flow into the hot-gas space both during and after withdrawal of plug 7. When the plug has been removed, cooling of standpipe 2 is aided by the cooling system of the charging machine, so that also during this phase of operation the stresses on standpipe 2 remain within acceptable limits.

I claim:

1. A method of operating a gas-cooled nuclear reaction which is refuelled through a standpipe (2) located in the reactor vessel contiguous to the core of the reactor, the standpipe being closable by a plug (7) and the standpipe and plug being provided with a cooling system, the plug (7) accommodating a control-rod (22) and incorporating a guide tube (19) through which the control rod can be introduced into and withdrawn from the reactor core, which method comprises supplying the plug (7) with cold gas corresponding to the cooling gas of the reactor in the forms of a primary flow ("*a*") of cold gas which blows over and removes heat from the plug (7) and a secondary flow ("*b*") of cold gas which flows over and removes heat from the control rod guide system (19 – 22), and passing both flows to the reactor core, the pressures of the primary ("*a*") and secondary ("*b*") flows being at least as high as is the highest gas pressure in the reactor core.

2. Apparatus for carrying out the procedure claimed in claim 1, in which the plug (7), having a sleeve (10) on the reactor side, is located in the standpipe (2) by means of a positive-acting fixing device (5) with double seals (6) and a locking device (9), and between the standpipe (2) and the sleeve (10) of the plug (7) there is an annular space (25) which is closed with respect to the reactor core by a permeable throttle (26), the annular space (25) being connected to a source of cold gas by a pipe (28) contained in the reactor vessel (1) and the annular space (25) being connected by way of at least one cross-channel (27) to the guide tube (19) of the control rod (22) which is provided with an annular gap (20) open at the end towards the reactor core.

3. Apparatus as defined in claim 2, in which the throttle (26) comprises a piston-ring seal (26').

* * * * *